United States Patent
Cerny et al.

(10) Patent No.: US 10,242,785 B2
(45) Date of Patent: Mar. 26, 2019

(54) VALVE FOR METERING FLUID

(71) Applicant: Robert Bosch GmbH, Stuttgart (DE)

(72) Inventors: Stefan Cerny, Ludwigsburg (DE); Ralf Kromer, Vaihingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 5 days.

(21) Appl. No.: 15/036,683

(22) PCT Filed: Nov. 11, 2014

(86) PCT No.: PCT/EP2014/074224
§ 371 (c)(1),
(2) Date: May 13, 2016

(87) PCT Pub. No.: WO2015/071236
PCT Pub. Date: May 21, 2015

(65) Prior Publication Data
US 2016/0293311 A1 Oct. 6, 2016

(30) Foreign Application Priority Data

Nov. 18, 2013 (DE) .................. 10 2013 223 458

(51) Int. Cl.
*H01F 7/16* (2006.01)
*F16K 1/14* (2006.01)
(Continued)

(52) U.S. Cl.
CPC .............. *H01F 7/16* (2013.01); *F01N 3/206* (2013.01); *F02M 51/0685* (2013.01);
(Continued)

(58) Field of Classification Search
CPC ... H01F 7/16; H01F 7/088; H01F 3/12; H01F 7/1607; H01F 7/081; H01F 2007/086;
(Continued)

(56) References Cited

U.S. PATENT DOCUMENTS 5,901,941 A * 5/1999 Ricco .................. F02M 47/027
239/585.3
6,279,873 B1 * 8/2001 Eichendorf ........ F02M 51/0685
251/129.19
(Continued)

FOREIGN PATENT DOCUMENTS

DE 100 36 811 A1 2/2002
DE 10108945 9/2002
(Continued)

OTHER PUBLICATIONS

International Search Report dated Feb. 4, 2015, of the corresponding International Application PCT/EP2014/074224 filed Nov. 11, 2014.

*Primary Examiner* — Mary McManmon
*Assistant Examiner* — Patrick Williams
(74) *Attorney, Agent, or Firm* — Norton Rose Fulbright US LLP; Gerard Messina (57) ABSTRACT

A valve for metering fluid has an electromagnet for actuating a valve needle controlling a metering opening. The electromagnet generates, upon current flow, a magnetic flux that proceeds via an outer pole, a hollow-cylindrical inner pole, an armature displaceable on an armature guidance region embodied on the valve needle, and a working air gap delimited by the armature and inner pole. Disposed fixedly on the valve needle is an entraining element that penetrates axially displaceably into an entraining element guidance region embodied in the inner pole and has a radial stop shoulder for the armature which delimits a take-up travel or pre-stroke travel. The entraining element is extended into an additional inner pole having a pole surface formed by the stop shoulder, and is embodied magnetically conductively and a magnetic flux between the armature and valve needle (Continued)

is suppressed by way of a magnetically nonconductive material.

16 Claims, 5 Drawing Sheets

(51) Int. Cl.
  *F01N 3/20* (2006.01)
  *F16K 31/06* (2006.01)
  *F02M 61/10* (2006.01)
  *H01F 7/08* (2006.01)
  *F02M 51/06* (2006.01)
  *F02M 61/16* (2006.01)
  *F02M 63/00* (2006.01)

(52) U.S. Cl.
  CPC .......... *F02M 61/10* (2013.01); *F02M 61/166* (2013.01); *F02M 63/0075* (2013.01); *F16K 1/14* (2013.01); *F16K 31/0665* (2013.01); *F16K 31/0686* (2013.01); *F16K 31/0693* (2013.01); *H01F 7/081* (2013.01); *H01F 7/088* (2013.01); *H01F 7/1607* (2013.01); *F02M 2200/08* (2013.01); *F02M 2200/30* (2013.01); *F02M 2200/9053* (2013.01); *F02M 2200/9061* (2013.01); *F02M 2200/9069* (2013.01); *H01F 2007/086* (2013.01)

(58) Field of Classification Search
  CPC .... F16K 31/0693; F16K 31/0665; F16K 1/14; F16K 31/0686; F02M 61/10; F02M 51/0685; F02M 63/0075; F02M 61/166; F02M 2200/9069; F02M 2200/9061; F02M 2200/30; F02M 2200/08; F01N 3/206; F01M 2200/9053
  See application file for complete search history.

(56) References Cited

U.S. PATENT DOCUMENTS

| | | | |
|---|---|---|---|
| 8,556,194 B2 * | 10/2013 | Mieney | F02M 51/0628 239/585.1 |
| 2007/0114299 A1 | 5/2007 | Scheffel | |
| 2008/0277505 A1 * | 11/2008 | Hoang | F02M 51/0685 239/585.5 |
| 2011/0278368 A1 | 11/2011 | Hornby | |
| 2013/0037633 A1 * | 2/2013 | Walter | H01F 7/081 239/585.1 |

FOREIGN PATENT DOCUMENTS

| | | |
|---|---|---|
| DE | 102010062420 | 6/2011 |
| DE | 102011080693 | 2/2013 |
| DE | 102012220477 | 5/2013 |
| EP | 2557576 | 2/2013 |
| EP | 2644879 | 10/2013 |
| WO | WO 2009/106080 | 9/2009 |
| WO | WO 2013/085140 | 6/2013 |

* cited by examiner

FIG. 5

VALVE FOR METERING FLUID

FIELD

The present invention proceeds from a valve for metering fluid; the higher-order term "fluid," denoting a flowing medium, is used in accordance with flow theory for gases and liquids.

BACKGROUND INFORMATION

A conventional fuel injection valve, described, for example, in German Patent Application No. DE 101 08 945 A1, has a sleeve-shaped nozzle body that is closed off by a valve seat body having a spray opening surrounded by a valve seat. In the nozzle body, the spray opening is preceded by a valve chamber that is in communication with a fuel inflow. Penetrating into the nozzle body is a valve needle that controls the spray opening and carries a closure head forming a sealing fit with the valve seat. The valve needle is acted upon, at the needle end facing away from the closure head, by a valve closing spring that presses the closure head onto the valve seat so that the spray opening is closed off. Uncovering of the spray opening is brought about by an electromagnet that drives the valve needle, against the force of the valve closing spring, to perform a stroke that lifts the closure head off the valve seat. A current flow through the electromagnet causes a magnetic flux that proceeds via an outer pole, an inner pole, an armature sitting axially displaceably on the valve needle, and a working air gap enclosed between the armature and inner pole, and generates in the working air gap a magnetic force that drives the armature to perform a linear stroke motion toward the inner pole. Disposed fixedly on the valve needle is an entraining element that is guided axially displaceably in the interior of the hollow-cylindrical inner pole and has a first armature stop for the armature. A second armature stop is fastened on the valve needle on the side of the armature facing away from the entraining element, against which stop the armature is pressed by a pre-stroke spring braced between the armature and entraining element. Upon current flow through the electromagnet the armature firstly imparts a take-up travel or pre-stroke to the valve needle until it comes to a stop against the first armature stop on the entraining element, thereby imparts a mechanical momentum to the valve needle, and entrains the valve needle via the entraining element, with the result that the closure head begins to lift off from the valve seat. At the end of the complete armature stroke, the armature comes to a stop against the pole surface of the inner pole and the spray opening is completely uncovered, so that the fuel under pressure in the valve chamber is sprayed through the spray opening in a metered quantity. When current flow through the electromagnet ceases, the valve closing spring presses the closure head, via the valve needle, onto the valve seat, and the pre-stroke spring presses the armature against the second armature stop.

SUMMARY

A valve according in accordance with the present invention may have the advantage that because of the configuration of the entraining element as an additional inner pole, the force with which the armature strikes, at the end of its stroke, against the inner surface of the inner pole is reduced, so that the impact noise of the armature is also appreciably less. There is assurance in this context that the momentum in the valve-opening direction imparted to the valve needle by the armature coming to a stop against the stop shoulder of the entraining element is not decreased in terms of its intensity. The reduction in the magnetic force bringing about the subsequent armature impact onto the inner pole is achieved by the fact that at the end of the armature's pre-stroke, with the armature coming to a stop against the entraining element, that part of the magnetic flux which proceeds through the entraining element abutting gaplessly against the armature makes no contribution to the magnetic force effective in the remaining working air gap between the armature and inner pole. With the magnetic force, thereby reduced, in the remaining part of the working air gap, the armature is pulled against the pole surface of the inner pole and strikes more gently and less noisily against the inner pole. The risk that the armature will bounce upon impact against the inner pole is also decreased by the reduced magnetic force.

As a result of the expansion, according to the present invention, of the entraining element into an additional inner pole, the armature is also appreciably more strongly accelerated upon current flow through the electromagnet, since as a result of the smaller gap between the armature and stop shoulder on the entraining element (called the "armature take-up travel" or "armature pre-stroke travel") as compared with the working air gap between the armature and the pole surface of the inner pole, the magnetic flux generates a stronger magnetic force acting on the armature. The opening momentum transferred to the valve needle as the armature comes to a stop against the stop shoulder of the entraining element is thus also stronger, and ensures reliable and delay-free uncovering of the metering opening.

A further result of the expansion, according to the present invention, of the entraining element into an additional inner pole is that the active pole area for the opening stroke of the armature, which area is obtained from the sum of the pole area of the inner pole and the pole area of the additional inner pole, is larger with no change in the installation space for the valve, so that a greater magnetic force is available for the opening stroke of the armature or, for the same magnetic force, the magnitude of the current flow through the electromagnet can be designed to be lower.

The magnetic flux barrier between the armature and valve needle in the armature guidance region of the valve needle, by way of a material having a high magnetic resistance, can be implemented in various ways.

According to a first exemplifying embodiment of the present invention, the valve needle is manufactured entirely, or at least in its needle portion forming the armature guidance region, from a magnetically nonconductive material, i.e., a material having a very high magnetic resistance; and the armature is manufactured entirely from a magnetically conductive material, i.e., a material having a high magnetic conductivity.

According to a second embodiment of the present invention, the valve needle is made, entirely or at least in its needle portion forming the armature guidance region, from a magnetically conductive material, i.e., a material having a very low magnetic resistance; and the armature has an inner region, surrounding the valve needle, made from a magnetically nonconductive material, i.e., a material having a low magnetic conductivity, and an outer region, gaplessly surrounding the inner region, made from a magnetically conductive material, i.e., a material having a low magnetic resistance. In the latter case it is advantageous in terms of achieving an optimum result if, according to a further embodiment of the present invention, the inner region of the armature is in the form of a straight truncated circular cone having an annular upper surface facing toward the entraining element and an annular base surface facing away from the entraining element, and if the outer region, surrounding the inner region, is in the form of a cylindrical ring having an inner ring wall proceeding in a truncated conical shape. It is advantageous here that the outside diameter of the annular top surface is slightly larger than the outside diameter of the valve needle, and that the outside diameter of the annular base surface is slightly smaller than the outside diameter of the armature. An armature of this kind is obtained in particularly simple fashion with a two-component part made from a material having a high magnetic resistance and a material having a low magnetic resistance.

BRIEF DESCRIPTION OF THE DRAWINGS

The present invention is explained in further detail below with reference to exemplifying embodiments depicted in the figures.

DETAILED DESCRIPTION OF EXAMPLE EMBODIMENTS

Figure 1:
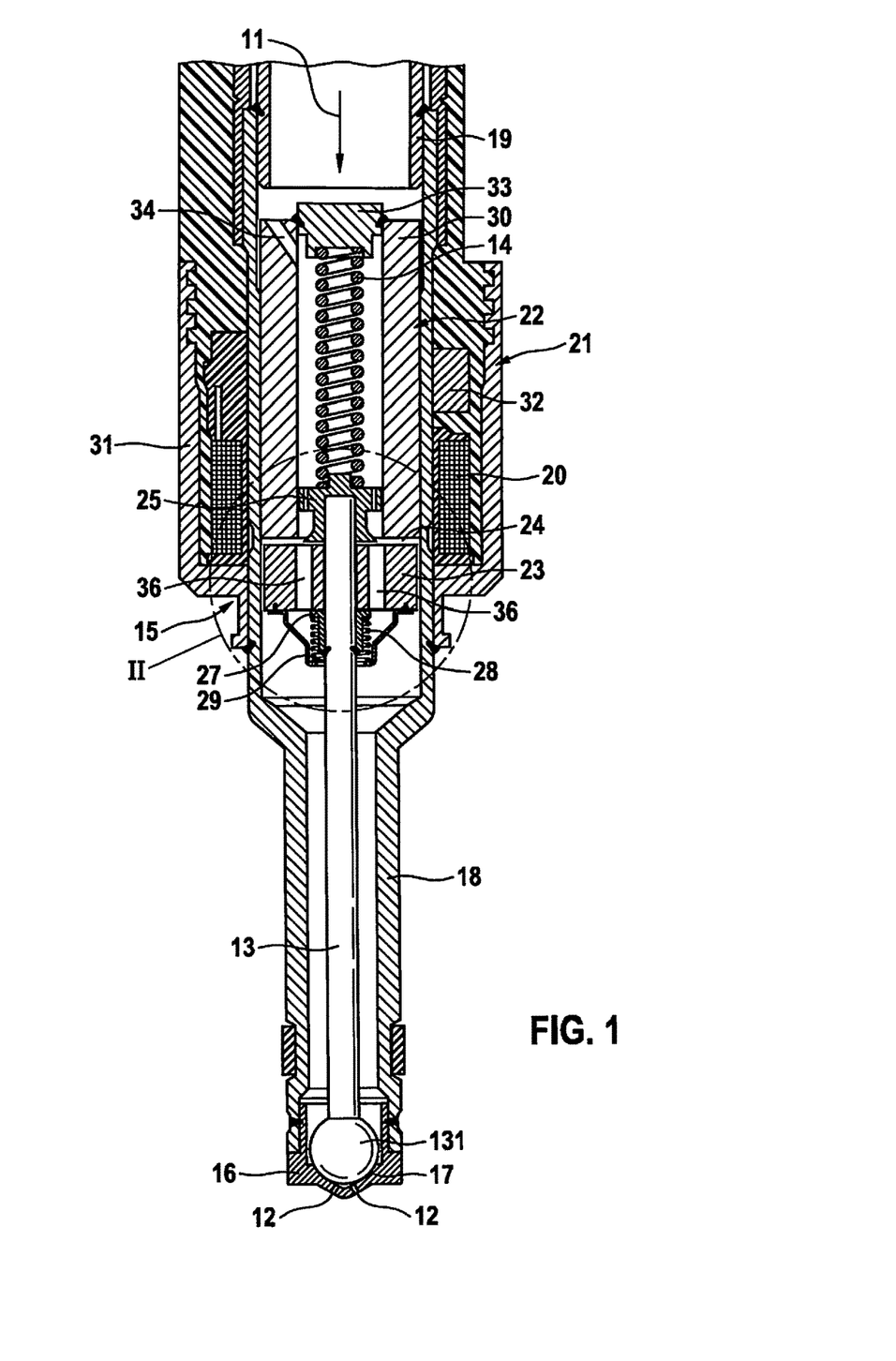
FIG. 1 shows, in part, a section through a valve for metering fluid, having an electromagnet having an armature for valve control.

The valve for metering fluid depicted in part in longitudinal section in FIG. 1 is preferably used as an injection valve for injecting fuel in a fuel injection system of internal combustion engines. It can also be utilized, however, in gas engines or in heating systems for controlled metering of fluid fuel, or as a metering valve for injecting a fluid reducing agent into the exhaust section of an internal combustion engine for the purpose of reducing nitrogen oxides.

The valve has a metering opening 12 in communication with a fluid inflow 11, as well as a valve needle 13 controlling metering opening 12 by way of a closure head 131, which needle is acted upon by a valve closing spring 14 in order to close metering opening 12 and is actuated by an electromagnet 15, against the closing force of valve closing spring 14, in order to uncover metering opening 12. Closure head 131 is guided in a valve seat body 16, which has metering opening 12 and a valve seat 17 that surrounds metering opening 12 and forms a sealing fit with closure head 131 of valve needle 13. Valve seat body 16 closes off in fluid-tight fashion a metering-side end of a sleeve-shaped valve housing 18, while a connector fitting 19, containing fluid inflow 11, is inserted into the other, inflow-side end of valve housing 18.

Figure 2:
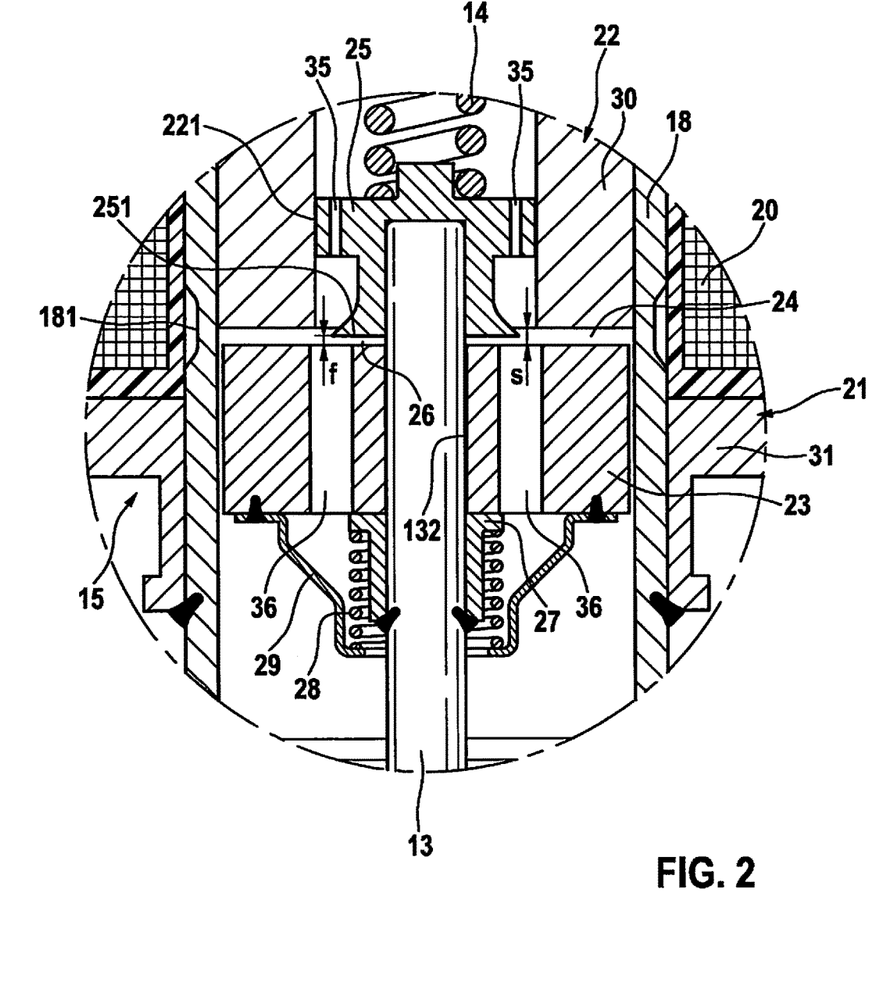
FIG. 2 is an enlarged depiction of portion II in FIG. 1.

Electromagnet 15 has a solenoid 20 to which current can flow via a connector plug (not depicted) on the valve. Upon current flow through solenoid 20, a magnetic flux is formed in electromagnet 15 and flows via an outer pole 21, a hollow-cylindrical inner pole 22, an armature 23 that is axially displaceable on an armature guidance region embodied on valve needle 13, and a working air gap 24 delimited by armature 23 and inner pole 22. An entraining element 25, which penetrates axially displaceably into an entraining element guidance region 221 embodied in the hollow-cylindrical interior of inner pole 22, is fixedly disposed on, e.g., welded onto, valve needle 13. Entraining element 25 possesses a radial stop shoulder 251 for armature 23, which delimits a take-up travel or pre-stroke travel 26 of armature 23, which travel is smaller as compared with the axial gap width of working air gap 24 (FIG. 2). This pre-stroke travel 26 of armature 23 is defined by an armature stop 27 that is fixedly disposed on valve needle 13 on the side of armature 23 facing away from entraining element 25, and a pre-stroke spring 28 that presses armature 13 against armature stop 27. A pot-shaped spring cup 29 that loosely surrounds valve needle 13 is fixedly disposed for this purpose on armature 23, and pre-stroke spring 28, embodied, e.g., as a helical compression spring, is placed onto valve needle 13 in such a way that it braces on the one hand against armature stop 27 and on the other hand against spring cup 29.

In order to improve the noise behavior of the valve, entraining element 25 is expanded into an additional inner pole having a pole surface formed by stop shoulder 251. Entraining element 25 is magnetically conductive for this purpose, i.e., is made from a material having low magnetic resistance, and there is provided between armature 23 and valve needle 13 an effective magnetic flux barrier that, by way of a magnetically nonconductive material, i.e., a material having a very high magnetic resistance, suppresses a magnetic flux between armature 23 and valve needle 13.

In the exemplifying embodiment of FIGS. 1 to 4, valve needle 13 is made, entirely or at least in its needle portion having armature guidance region 132, from a magnetically nonconductive material, and armature 23 is made entirely from a magnetically conductive material.

Figure 5:
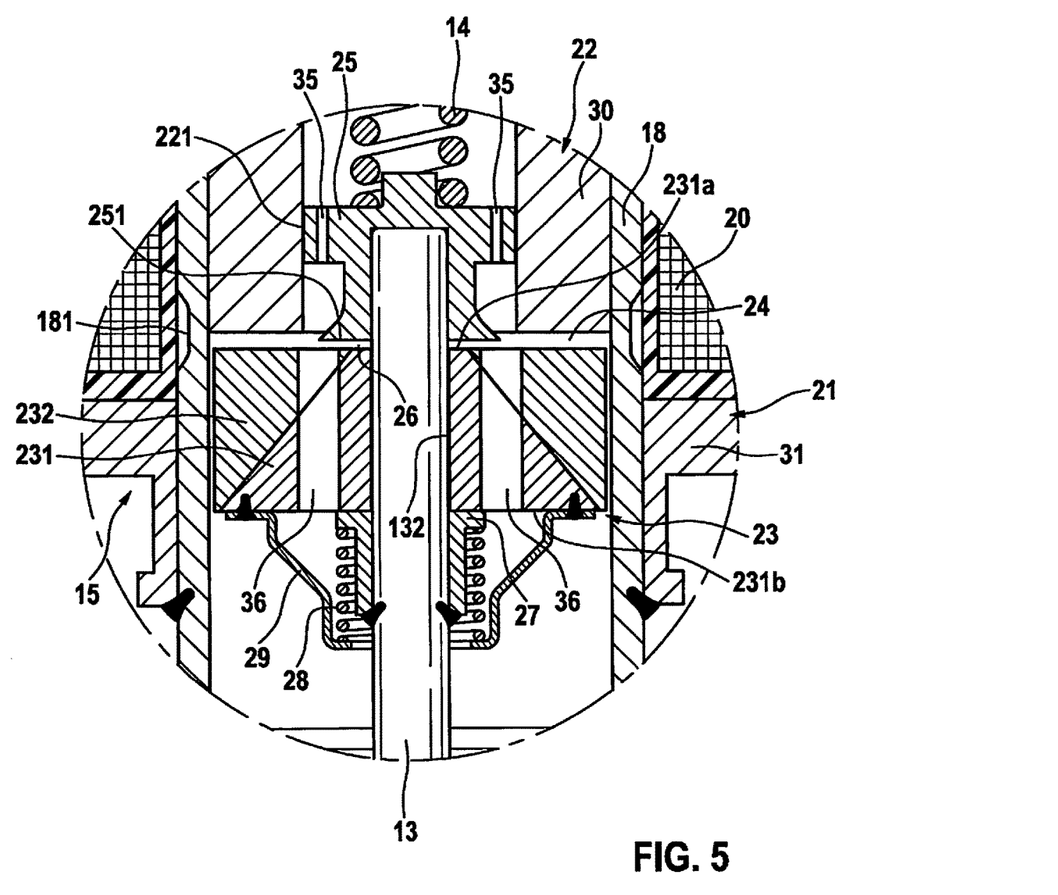
FIG. 5 is the same depiction as in FIG. 2, with a modification of the armature.

In contrast thereto, in the exemplifying embodiment according to FIG. 5 valve needle 13 is made, either entirely or at least in its needle portion having armature guidance region 132, from a magnetically conductive material; and armature 23 has an inner region 231 surrounding valve needle 13 and made from a magnetically nonconductive material, and an outer region 232 gaplessly surrounding inner region 231 and made from a magnetically conductive material. Inner region 231 of armature 23 is preferably in the form of a straight truncated circular cone having an annular top surface 231a facing toward entraining element 25 and an annular base surface 231b facing away from entraining element 25. The inside diameters of top surface 231a and base surface 231b are of the same size, but the outside diameter of top surface 231a is considerably smaller than the outside diameter of base surface 231b. Preferably the outside diameter of the annular top surface 231a is slightly larger than the outside diameter of valve needle 13, and the outside diameter of the annular base surface 231b is slightly smaller than the outside diameter of armature 23. Outer region 232 of armature 23 is in the form of a cylindrical ring having an inner ring wall proceeding in truncated conical fashion, the profile of which corresponds to the outer contour of inner region 231. Armature 23 according to FIG. 5 is preferably manufactured as a two-component part from a material having a high magnetic resistance and a material having a low magnetic resistance.

Figure 3:
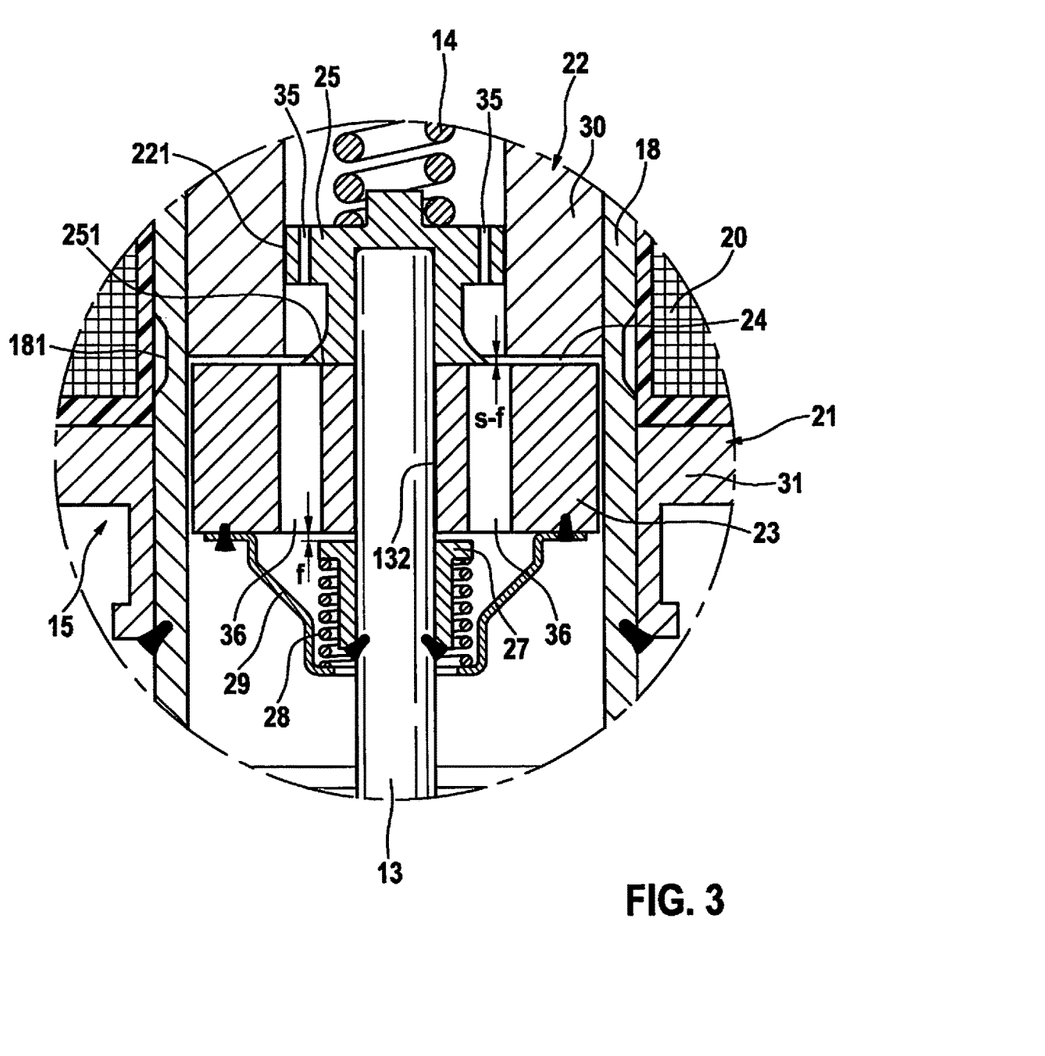
FIG. 3 is the same depiction as in FIG. 2, with current flowing through the electromagnet after a first stroke phase of the armature.
Figure 4:
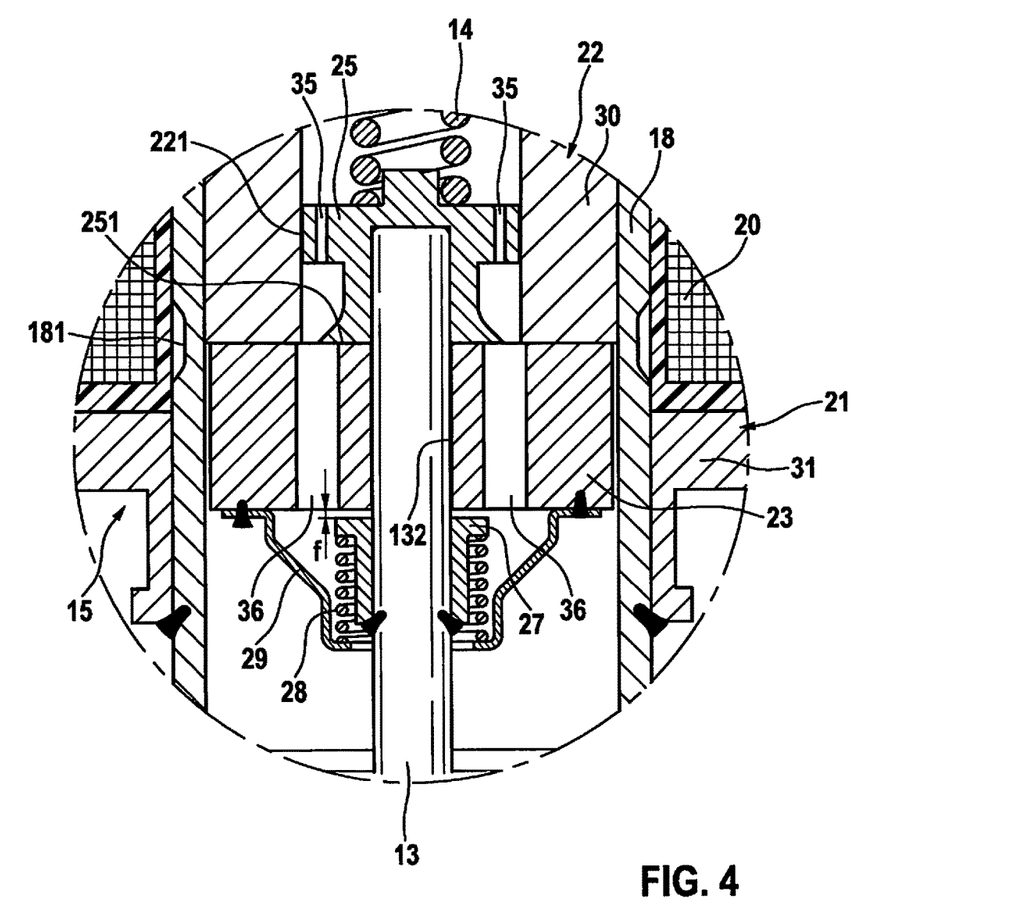
FIG. 4 is the same depiction as in FIG. 2, with current flowing through the electromagnet after a second stroke phase of the armature.

The manner of operation of entraining element 25, embodied as an additional inner pole, is illustrated in FIGS. 2 to 4.

In FIG. 2 there is no current flow through electromagnet 15, and metering opening 12 is closed by the fact that valve closing spring 14, engaging on entraining element 25, presses closure head 131 of valve needle 13 onto valve seat 17. The annular working air gap 24, having the axial gap width s, is present between inner pole 22 of electromagnet 15 and armature 23. Armature 23 is pressed by pre-stroke spring 28 against armature stop 27, so that a gap for a take-up travel or pre-stroke travel 26 of armature 23, having an axial gap width f, is established between the end face of armature 23 and stop shoulder 251 of entraining element 25.

When current flows through solenoid 20 of electromagnet 15 in this valve position, the magnetic flux in armature 23 generated by solenoid 20 splits into two paths, the first path proceeding via the armature end face directly to inner pole 22 and the second path via the armature end face to the additional inner pole, i.e., to entraining element 25. Because the gap width f is smaller than the gap width s, a greater magnetic force in relation to the pole area is possible in the second path. The result is that, upon current flow through solenoid 20, armature 23 is appreciably better accelerated out of its neutral or idle position on armature stop 27. The magnetic flux barrier made from magnetically nonconductive material between armature 23 and valve needle 13 prevents a spillover of magnetic flus into valve needle 13 and thus a magnetic short circuit via valve needle 13 and entraining element 25.

Armature 23, accelerated out of its neutral position, moves toward inner pole 22 as a result of the magnetic force generated by the magnetic flux, and firstly comes to a stop against stop shoulder 251 of entraining element 25 (FIG. 3). The distance between the armature end face and inner pole 22 has decreased to the gap width s-f. The magnetic force that acts between armature 23 and inner pole 22 is reduced, since because of the contact between armature 23 and entraining element 25, the magnetic flux in the second path on the one hand now increases, and on the other hand also makes no contribution to the magnetic force opening the valve.

As the linear stroke of armature 23 continues under the now-reduced magnetic force, it entrains entraining element 25 with the result that valve needle 13 is raised and closure head 131 lifts off from valve seat 17. The magnetic force with which armature 23 is pulled toward inner pole 22 is, as a result of what has been stated above, considerably less than the magnetic force for accelerating armature 23 out of its neutral position on armature stop 27. The result is that armature 23 impacts against inner pole 22 with appreciably less force, leading to a reduction in noise. When armature 23 is resting gaplessly in inner pole 22, the magnetic force between armature 23 and inner pole 22 is again increased. That part of the magnetic flux which leads via armature 23 to entraining element 25 and to inner pole 22 cannot be used to hold the valve open (FIG. 4).

In the exemplifying embodiments of the valve that are depicted in the drawings, inner pole 22 is constituted physically by a hollow-cylindrical magnet core 30 fastened in valve housing 18, and outer pole 21 by a magnet cup 31, externally surrounding valve housing 18 in the region of magnet core 30 and armature 23, having a magnetic return piece 32. Solenoid 20 sits on valve housing 18 and is surrounded by a larger-diameter cup portion of magnet cup 31, while a smaller-diameter cup portion of magnet cup 31 is fastened, e.g., welded, onto valve housing 18. Because, in the physical embodiment, valve housing 18 is made from a magnetically conductive material and magnet cup 31 and magnet core 30 abut against valve housing 18, in order to avoid a magnetic short circuit between the inner and outer poles 22, 21 a magnetic "bottleneck" is constituted by an annular constriction 181 in the wall of valve housing 18 between the portions of valve housing 18 abutting respectively against magnet cup 31 and against magnet core 30. The radial stop shoulder 251 embodied on entraining element 25 preferably has a shoulder width that extends from valve needle 13 to close to the inner wall of magnet core 30. In order to influence the distribution of the magnetic flux in a magnetic flux path leading from armature 23 directly to inner pole 22 and from armature 23 via entraining element 25, the ratio of the pole area of inner pole 22 to the annular stop shoulder 251 on entraining element 25, constituting the pole area of the additional inner pole, can be varied over a wide range.

Valve closing spring 14, embodied e.g. as a helical compression spring, is disposed in the hollow interior of magnet core 30 and braces on the one hand against entraining element 25 and on the other hand against an alignment piece 33 fastened on magnet core 30. Fluid flow from fluid inflow 11 to metering opening 12 occurs via at least one oblique orifice 34 opening into the interior of the hollow-cylindrical magnet core 30, and via respective axial orifices 35 and 36 introduced on the one hand into entraining element 25 and on the other hand into armature 23.

What is claimed is:

1. A valve for metering fluid, comprising:
a metering opening in communication with a fluid inflow;
a valve needle configured to control the metering opening;
a valve closing spring applying a closing force acting on the valve needle in a direction to close the metering opening;
a magnetically conductive entraining element disposed fixedly on the valve needle; and
an electromagnet configured to actuate the valve needle against the closing force of the valve closing spring to uncover the metering opening by generating, upon current flow, a magnetic flux path that proceeds via an outer pole, a hollow-cylindrical inner pole, an armature displaceable on an armature guidance region embodied on the valve needle, and a first air gap that is delimited by the armature and the inner pole such that a region of the air gap extends continuously from the armature to the inner pole without any solid matter in the region;
wherein:
the entraining element penetrates axially displaceably into an entraining element guidance region embodied in the inner pole and includes a radial stop shoulder for the armature which delimits a take-up or pre-stroke travel distance of the armature;
with respect to an axial direction parallel to a longitudinal extension of the valve needle, the take-up or pre-stroke travel distance is smaller than the first air gap; and
a magnetic flux between the armature and the valve needle is suppressed by way of a magnetically non-conductive material.

2. The valve as recited in claim 1, wherein the valve needle is made, at least in a needle portion having the armature guidance region, from a magnetically nonconductive material, and the armature is made entirely from a magnetically conductive material.

3. The valve as recited in claim 1, wherein the valve needle is made, at least in a needle portion having the armature guidance region, from a magnetically conductive material, and the armature has an inner region, surrounding the valve needle, made from a magnetically nonconductive material and an outer region, gaplessly surrounding the inner region, made from a magnetically conductive material.

4. The valve as recited in claim 3, wherein the inner region of the armature is a straight truncated circular cone having an annular upper surface facing toward the entraining element and an annular base surface facing away from the entraining element, and the outer region, gaplessly surrounding the inner region, is a cylindrical ring having an inner ring wall proceeding in a truncated conical shape.

5. The valve as recited in claim 4, wherein an outside diameter of a top surface of the truncated circular cone is slightly larger than an outside diameter of the valve needle, and an outside diameter of the base surface of the truncated circular cone is slightly smaller than an outside diameter of the armature.

6. The valve as recited in claim 3, wherein the armature is manufactured as a two-component part.

7. The valve as recited in claim 6, wherein the inner pole is constituted by a hollow-cylindrical magnet core fastened in a valve housing, and the outer pole by a magnet cup, surrounding the valve housing in the region of the magnet core, having a magnetic return piece to the magnet core; and wherein the radial stop shoulder, embodied on the entraining element, for the armature has a shoulder width that extends from the valve needle to close to the inner wall of the magnet core.

8. The valve as recited in claim 7, wherein the valve closure spring, which braces on the one hand against the entraining element and on the other hand against an alignment piece fastened on the magnet core, is disposed in the magnet core.

9. The valve as recited in claim 1, wherein a take-up or pre-stroke travel of the armature, which is over the take-up or pre-stroke travel distance up to the stop shoulder on the entraining element, is defined by an armature stop that is fixedly disposed on the valve needle on the side of the armature facing away from the entraining element, and a pre-stroke spring that presses the armature against the armature stop.

10. The valve as recited in claim 9, wherein a spring cup that that loosely surrounds the valve needle is fixedly disposed on the armature, and the pre-stroke spring braces on the one hand against the armature stop and on the other hand against the spring cup.

11. A valve for metering fluid, comprising:
a metering opening in communication with a fluid inflow;
a valve needle configured to control the metering opening;
a valve closing spring applying a closing force acting on the valve needle in a direction to close the metering opening;
a magnetically conductive entraining element disposed fixedly on the valve needle; and
an electromagnet configured to actuate the valve needle against the closing force of the valve closing spring to uncover the metering opening by generating, upon current flow, a magnetic flux path that proceeds via an outer pole, a hollow-cylindrical inner pole, an armature displaceable on an armature guidance region embodied on the valve needle, the entraining element, a first air gap delimited by the armature and the entraining element, and a second air gap delimited by the armature and the inner pole;
wherein:
the magnetic flux path splits into:
a first path from the armature to the entraining element through the first air gap, without passing through the inner pole; and
a second path that is independent of the first path and is from the armature to the inner pole through the second air gap without passing through the entraining element; and
the entraining element penetrates axially displaceably into an entraining element guidance region embodied in the inner pole and includes a radial stop shoulder for the armature which delimits the first air gap;
with respect to an axial direction parallel to a longitudinal extension of the valve needle, the first air gap is smaller than the second air gap;
the first air gap defines a distance of a take-up or pre-stroke travel of the armature; and
a magnetic flux between the armature and the valve needle is suppressed by way of a magnetically non-conductive material.

12. The valve as recited in claim 11, wherein:
a radially exterior region of an exterior end face of the armature directly faces an end face of the inner pole in the axial direction, without interruption by the entraining element; and
a radially interior region of the exterior end face of the armature directly faces an end face of the radial stop shoulder of the entraining element without interruption by the inner pole.

13. The valve as recited in claim 12, wherein the valve is configured so that:
in absence of the magnetic flux, the armature is in a rest position in which the first and second air gaps are present; and
the armature is configured to travel, in response to generation of the magnetic flux, from (a) the rest position to (b) an intermediate position in which the first air gap is completely closed, the second air gap is partially opened, and the radially interior region of the exterior end face of the armature abuts against the end face of the radial stop shoulder, and then on to (c) a valve open position in which the first and second air gaps are both completely closed, the radially interior region of the exterior end face of the armature abuts against the end face of the radial stop shoulder, and the radially exterior region of the exterior end face of the armature abuts against the end face of the inner pole.

14. The valve as recited in claim 13, wherein:
the travel from the rest position to the intermediate position is the take-up or pre-stroke travel, during which the valve needle remains in a rest position against the metering opening; and
the travel from the intermediate position to the valve open position causes the valve needle to lift off the metering opening.

15. The valve as recited in claim 11, wherein the valve is configured so that:
in absence of the magnetic flux, the armature is in a rest position in which the first and second air gaps are present; and
the armature is configured to travel, in response to generation of the magnetic flux, from the rest position to an intermediate position in which the first air gap is completely closed and the second air gap is partially opened and then on to a valve open position in which the first and second air gaps are both completely closed.

16. The valve as recited in claim 15, wherein:
the travel from the rest position to the intermediate position is the take-up or pre-stroke travel, during which the valve needle remains in a rest position against the metering opening; and the travel from the intermediate position to the valve open position causes the valve needle to lift off the metering opening.

* * * * *